J. S. CULP.
DEMOUNTABLE RIM FOR VEHICLE WHEELS.
APPLICATION FILED AUG. 5, 1921.
1,433,804.
Patented Oct. 31, 1922.
4 SHEETS—SHEET 1.
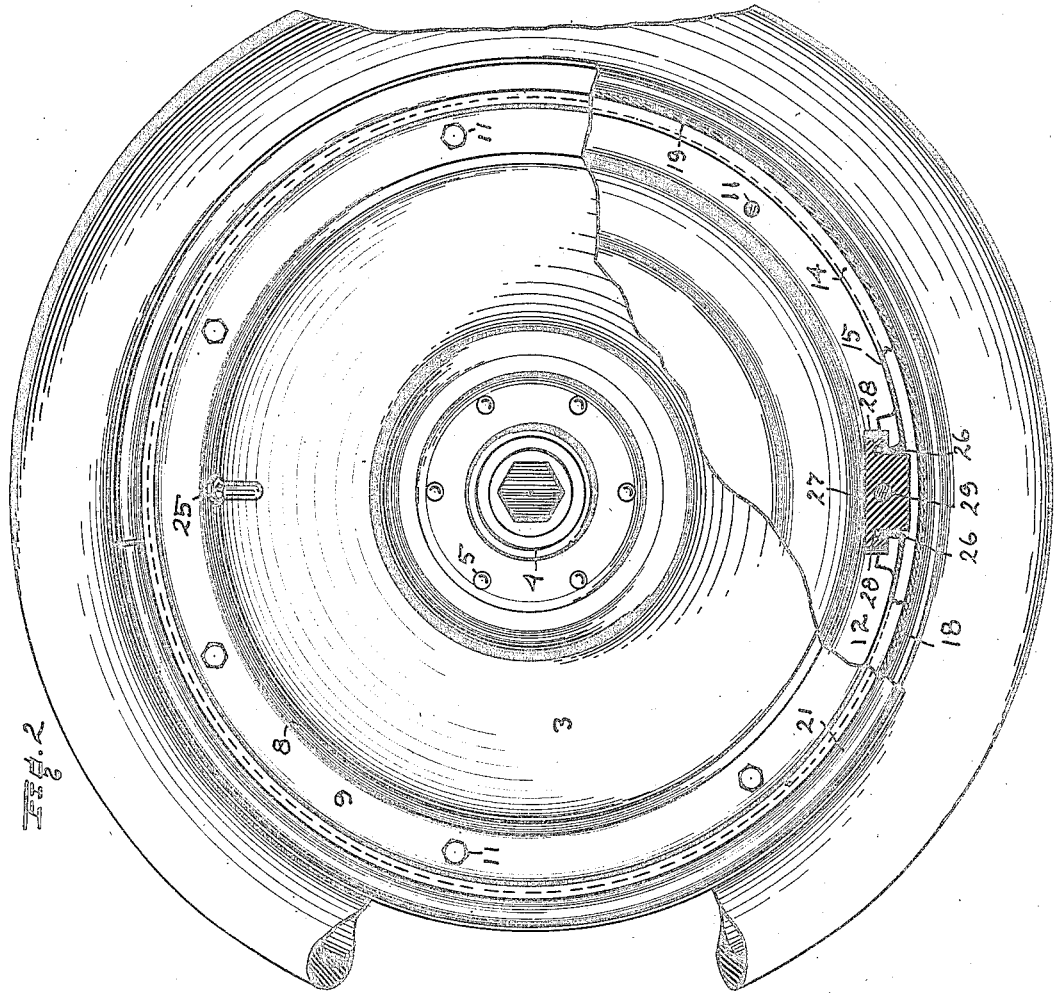
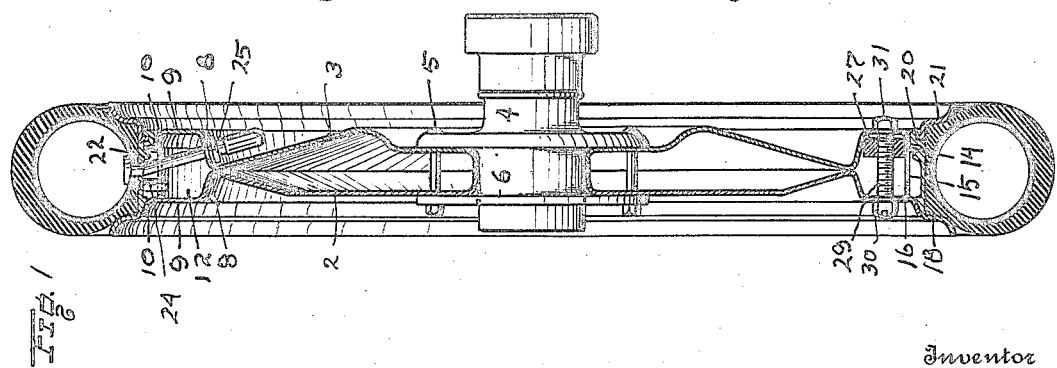
Inventor
J. S. CULP.

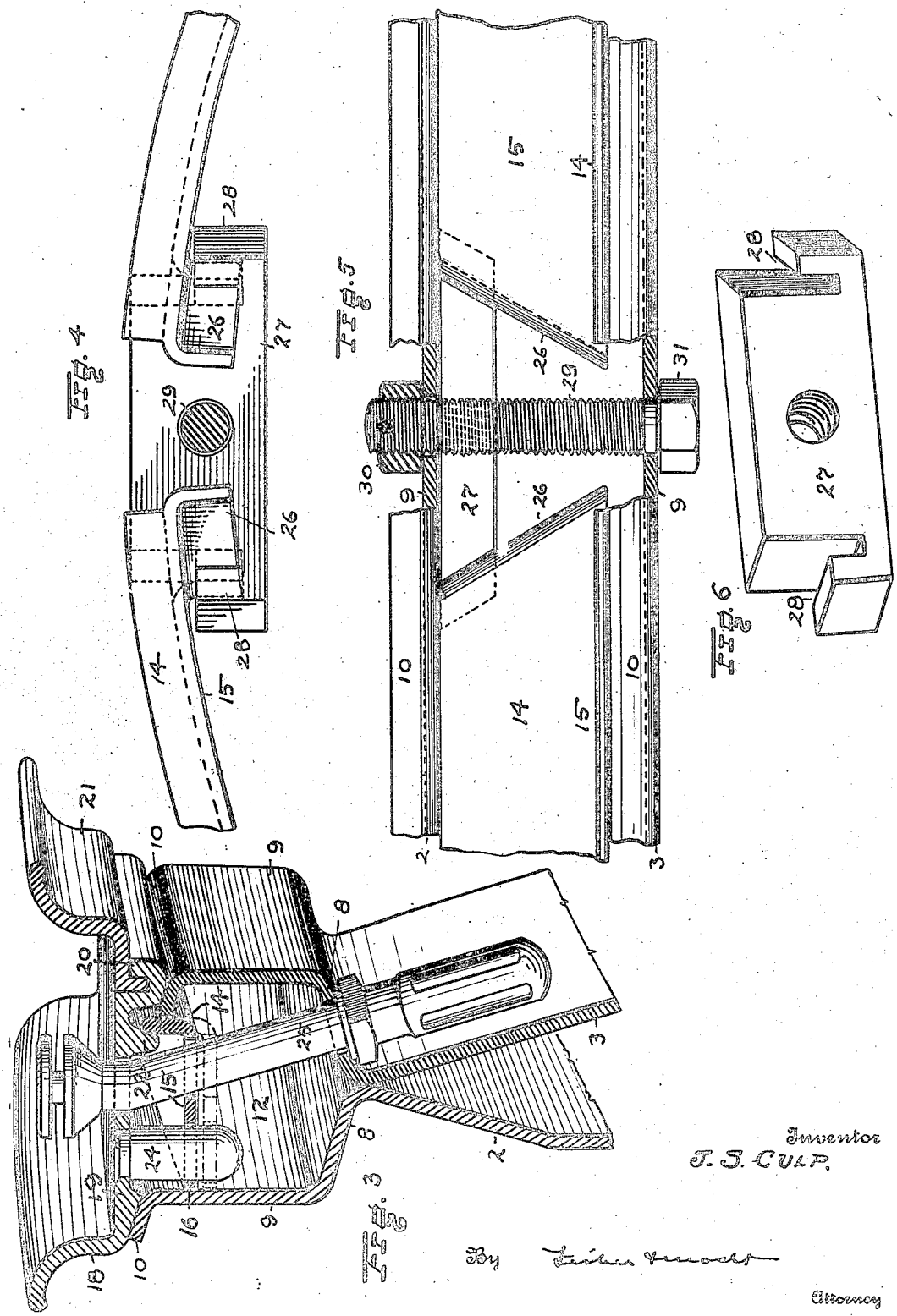

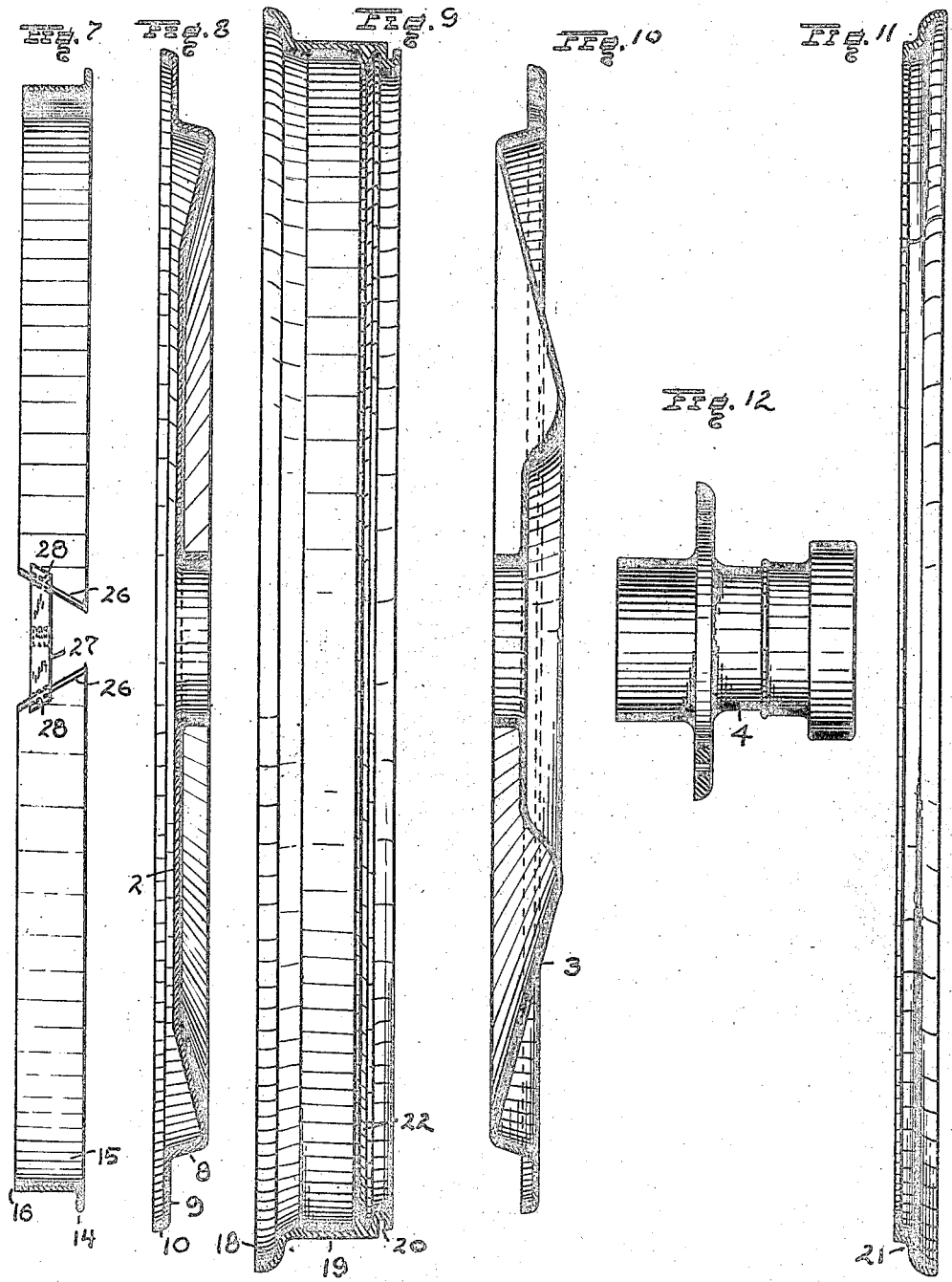

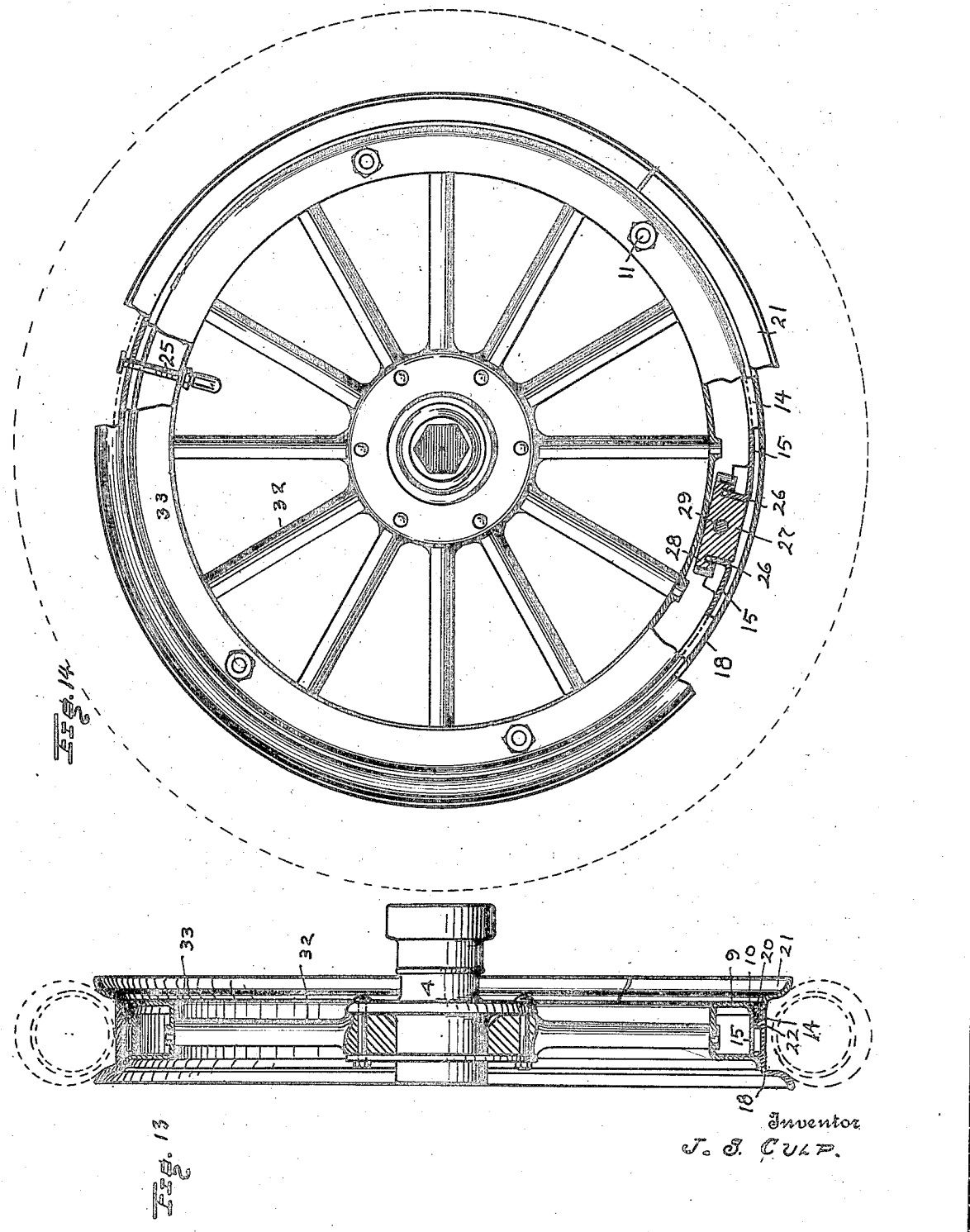

Patented Oct. 31, 1922.

1,433,804

UNITED STATES PATENT OFFICE.

JAY STANLY CULP, OF CLEVELAND, OHIO, ASSIGNOR TO THE CULP STEEL PRODUCTS COMPANY, A CORPORATION OF OHIO.

DEMOUNTABLE RIM FOR VEHICLE WHEELS.

Application filed August 5, 1921. Serial No. 490,033.

*To all whom it may concern:*

Be it known that I, JAY STANLY CULP, a citizen of the United States, residing at Cleveland, in the county of Cuyahoga and State of Ohio, have invented certain new and useful Improvements in Demountable Rims for Vehicle Wheels, of which the following is a specification.

This invention relates to demountable rims for vehicle wheels, and the primary object of the invention is to provide a simple assembly of parts adapted to secure a demountable rim quickly in true alignment on a wheel body or felloe and also adapted to permit the rim to be locked and unlocked by merely rotating a single bolt or screw. The main locking element is also particularly constructed and arranged to engage the rim at its inner circumference and to be entirely housed and protected within a hollow body or felloe of the wheel, all as herein more fully described and pointed out in the claim.

In the accompanying drawings, Fig. 1 is a sectional view of a disk and wheel embodying my invention, and Fig. 2 is a side elevation of the wheel, partly broken away to disclose the internal construction. Fig. 3 is an enlarged cross sectional view of a portion of the rim and wheel showing a tire inflating valve in position. Fig. 4 is an enlarged side elevation of the flanged ends of the split locking ring and the yoke member connected with said ends. Fig. 5 is a plan view of the parts shown in Fig. 4, including a portion of the side plates or walls which form the body and the felloe portions of the wheel. Fig. 6 is a perspective view of the wedge-shaped member for expanding and contracting the locking ring. Figs. 7, 8, 9, 10 and 11 are sectional views of the main wheel parts separated, and Fig. 12 is a side view of the hub for the wheel. Figs. 13 and 14 are sectional and side views, respectively, of a wheel having wooden spokes and a metal felloe embodying the same rim and locking device illustrated in the other figures.

The invention comprises a wheel in which a hollow felloe portion is provided to confine and hold an expansible locking ring and in Figs. 1 to 12, inclusive, I show a disk wheel having a body formed of two pressed steel disks or plates 2 and 3 respectively, which are clamped together at their middle by a flanged hub 4, bolts 5 and a clamping ring or flange 6. Disks 2 and 3 are dished in their central area and come together in bearing engagement where provided with oppositely-extending annular offsets 8—8, and the outer circular portion of each disk comprises a straight wall 9 extending at right angles to the axis of the wheel and a short end flange or lip 10 extends at an acute inclination to each wall 9 toward the rear side of the wheel. When the two disks are assembled their circular felloe portions are united together at spaced intervals by tie-bolts 11, and the space between the parallel walls 9 provides an annular channel or compartment 12 through which bolts 11 extend transversely. The inturned flange 10 of front disk 3 projects into this channel or compartment where it is adapted to engage the flat side of a vertical flange 14 of an expansible and contractible metal ring 15 which is loosely seated within the channel or compartment 12 with its rear edge 16 slidably engaged with wall 9 of rear disk 2, see Fig. 3. Ring 15 encircles the tie-bolts 11 and when collapsed or contracted to its smallest diameter it is adapted to rest on said bolts with the upper edge of locking flange 14 flush with or below the outer seating surface of the inturned flange 10 of front disk 3, see dotted lines, Fig. 3. When locking ring 14 is contracted flange 14 offers no obstruction to the seating or unseating of a channeled rim 18 having a tire seating base 19 which is of tapering or wedge formation in cross section so that it may be wedged upon the inclined flanges 10—10, and as shown the rim base 19 has a border groove and seat 20 adapted to receive and hold a separate tire locking member 21. This member is split so that it may be easily removed and replaced and its form in cross section may be as shown to hold a flat-sided tire or it may be constructed in the conventional way to hold a clencher tire.

Locking of the tire-seating rim 18 upon the wheel body is effected by flange 14 when forced outwardly against a beveled or tapering rib 22 on the bottom side of base 19. This rib is endless, that is, it extends around the inner circumference of the rim and has its outer face or side inclined to assure contact and to effect a wedging action adapted to force rim 18 toward the rear side of the wheel and to a definite seating position upon flanges 10—10. One or more driving lugs 24 may be affixed to the inner circumference of rim 18 opposite ring 15 so that these parts may be locked against independent rotation, and ring 15 is provided with a notch or opening to receive lug 24. Ring 15 is also provided with an opening through which the body of a tire valve 25 is adapted to be inserted and which valve body is long enough to also pass through an opening in the offset wall 8 of front disk 3, see Fig. 3.

Locking ring 15 is divided transversely and each free end is provided with an inwardly-turned flange 26 which extends across the face of the flat ring at an acute angle to the axis of the ring, the inclined flange at one end of the ring being reverse to the inclined flange at the opposite end of the ring. Briefly stated, these flanges are reversely inclined in respect to each other and spaced apart sufficiently to permit the ends of the ring to be brought together and the entire ring contracted to a smaller diameter through the use of a yoke member 27 having slotted or hooked extremities 28 in slidable connection with flanges 26. The end slots in yoke member 27 are reversely inclined to correspond with flanges 26 so that yoke member 27 will operate as a wedge to spread the divided ends of ring 15 when said yoke member is moved in one direction thereby expanding the entire ring, but when said yoke member is moved in the opposite direction the hooked ends of the yoke member will draw the ends of the locking ring toward each other and contract the ring. The yoke member is shifted by a screw-threaded bolt 29 rotatably supported at its opposite ends within openings in the straight walls 9—9 of disks 2 and 3 respectively, and longitudinal movement of the bolt is prevented by a nut 30 pinned to one end of the bolt at the rear side of the wheel and by an integral hexagonal or other angular head 31 exposed at the front of the wheel where a wrench may be applied to rotate the bolt. Head 31 may have a distinguishing mark to identify it from the other bolts or nuts exposed at the front side of the wheel, or it may be of a different shape or form, and in order to unlock the rim it is only necessary to rotate bolt 29 until yoke 27 is backed up against the rear disk as shown in Figs. 4 and 5. In this position of the parts the ring is contracted and entirely disengaged from rib 22 on the rim, and the rim is free and may be readily unseated, first at a point diametrically opposite the tire valve and then by uplift at the tire valve side. The operation is reversed in applying the rim to the wheel and when the rim is seated the screw or bolt 29 is rotated to bring yoke 27 forward which expands the locking ring and causes flange 14 to press against the tapering rib 22 at all points in the circle, thus aligning the rim with the locking ring and felloe and positively locking the rim on a continuous line circumferentially of the wheel.

In Figs. 13 and 14, I show a wheel having wooden spokes 32 and a hollow metal felloe 33 adapted to seat the same rim and locking elements hereinbefore described, like parts being indicated by like numerals.

What I claim is:

A vehicle wheel having a channeled periphery the inner flange thereof being provided with a wedging surface, a demountable rim fitting the said wedging surface and resting on the outer flange of the channel, a radially inwardly opening channel in the interior of the demountable rim the laterally inward wall thereof being inclined, a transversely split substantially cylindrical locking band provided with an outwardly radially extending flange adapted in seated position to contact with the wedging surface of the demountable rim channel, and means to expand and contract the locking band.

JAY STANLY CULP.